(12) United States Patent
Chiao

(10) Patent No.: US 9,085,036 B2
(45) Date of Patent: Jul. 21, 2015

(54) LIFTING ROD ASSEMBLY WITH A COOLANT SUPPLY AND PRESSURIZING DEVICE

(71) Applicant: EVERISING MACHINE CO., Taichung (TW)

(72) Inventor: Shu-Chia Chiao, Taichung (TW)

(73) Assignee: EVERISING MACHINE CO., Taichung (TW)

( * ) Notice: Subject to any disclaimer, the term of this patent is extended or adjusted under 35 U.S.C. 154(b) by 0 days.

(21) Appl. No.: 14/267,215

(22) Filed: May 1, 2014

(65) Prior Publication Data

US 2014/0352515 A1    Dec. 4, 2014

(30) Foreign Application Priority Data

May 30, 2013  (TW) .............................. 102210101 U

(51) Int. Cl.
*B23D 55/08*  (2006.01)
*B23D 59/04*  (2006.01)
*B23D 55/04*  (2006.01)
*B23D 55/00*  (2006.01)

(52) U.S. Cl.
CPC .............. *B23D 55/082* (2013.01); *B23D 55/00* (2013.01); *B23D 55/04* (2013.01); *B23D 55/086* (2013.01); *B23D 59/04* (2013.01); *Y10T 83/707* (2015.04)

(58) Field of Classification Search
CPC .... B12D 55/082; B23D 55/04; B23D 55/086; B23D 59/04; B23D 55/00; B23D 55/082; Y10T 83/707
USPC .......... 83/169, 170, 171, 809, 829, 455, 661, 83/935, 808, 821, 823, 824, 827, 828, 83/467.1, 820; 138/39, 115, 116, 117; 451/450

See application file for complete search history.

(56) References Cited

U.S. PATENT DOCUMENTS

| | | | | |
|---|---|---|---|---|
| 2,815,562 A * | 12/1957 | Wilkie et al. | ................. | 83/169 |
| 2,964,076 A * | 12/1960 | Debs | ............................. | 83/168 |
| 3,097,675 A * | 7/1963 | Benedict | ....................... | 83/169 |
| 3,104,575 A * | 9/1963 | Robinson | ...................... | 83/168 |
| 3,479,097 A * | 11/1969 | McLauchlan et al. | ......... | 384/12 |
| 3,754,490 A * | 8/1973 | Sata et al. | ..................... | 83/168 |
| 4,222,295 A * | 9/1980 | Sawamura | .................... | 83/169 |
| 4,501,181 A * | 2/1985 | Yakich | ........................... | 83/169 |
| 8,240,236 B2 * | 8/2012 | Benz | .............................. | 83/169 |

FOREIGN PATENT DOCUMENTS

JP          2774448 B2 *  7/1998
JP       2009248294 A  * 10/2009

* cited by examiner

*Primary Examiner* — Kenneth E. Peterson
*Assistant Examiner* — Jennifer Swinney
(74) *Attorney, Agent, or Firm* — Patent Office of Bang Shia

(57) ABSTRACT

A lifting rod assembly with a coolant supply and pressurizing device includes a pipe with an inner passage. The inner passage includes an open input end, an open output end, and an input section and an output section sequentially arranged from the open input end toward the open output end. The output section is in communication with the output end. In the inner passage is movably disposed a slider which is provided with a plurality of pressure flutes, each of the pressure flutes has a diameter smaller than the diameter of the input section, and both ends of the slider are provided with a plurality of buffers, a band saw of a band saw machine is allowed to insert in the output end of the lifting rod assembly, and the slider is abutted against the band saw.

3 Claims, 7 Drawing Sheets

US 9,085,036 B2

LIFTING ROD ASSEMBLY WITH A COOLANT SUPPLY AND PRESSURIZING DEVICE

BACKGROUND OF THE INVENTION

1. Field of the Invention

The present invention relates to a lifting rod assembly, and more particularly to a lifting rod assembly with a coolant supply and pressurizing device, which is used on a band saw machine.

2. Description of the Prior Art

A band saw machine is usually provided with a coolant supply device in order to prevent overheat or swarf accumulation.

The coolant supply device normally takes the form of an independent pipeline which is equipped with a discharge valve allowing the user to control the flow rate of the coolant. The independent coolant pipeline occupies a certain installation space of the band saw, making the structure of the band saw machine complicated, and the discharge valve is only capable of controlling flow rate but unable to pressurize the coolant. Therefore, when the band saw cuts a very small workpiece, the use has to change the location of the coolant pipeline to make it very close to and precisely targeted at the workpiece, so that the coolant can surely work at the workpiece, which is quite inconvenient. Otherwise, it will be totally wasteful if the coolant is not targeted at the workpiece.

The present invention has arisen to mitigate and/or obviate the afore-described disadvantages.

SUMMARY OF THE INVENTION

The primary objective of the present invention is to provide a lifting rod assembly with a coolant supply and pressurizing device, which is easy to install and use.

To achieve the above objective, a band saw machine in accordance with the present invention comprises: a lifting rod assembly with a coolant supply and pressurizing device, a pipe which runs through the lifting rod assembly and includes a peripheral wall which defines an inner passage, and the inner passage includes an open input end, an open output end, and an input section and an output section which are sequentially arranged from the open input end toward the open output end. The output section is in communication with the output end, and the input section includes a first diameter. In the inner passage is movably disposed a slider which is restricted in the inner passage, the slider is provided with a plurality of pressure flutes, each of the pressure flutes has a cross section smaller than the first diameter, and both ends of the slider are provided with at least four buffers which are located at each of the corners of the slider, a band saw of the band saw machine is inserted in the output end of the lifting rod assembly, and the slider is abutted against the band saw.

Coolant is outputted from the coolant supply and pressurizing device disposed in the lifting rod assembly, when the size of the workpiece changes, moving the lifting rod assembly can make the coolant supply and pressurizing device move to the workpiece. Besides, the flow velocity can be increased to improve swarf-removing efficiency and cooling efficiency. The present invention also stabilizes the saw band, and improves cutting accuracy and yield rate.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
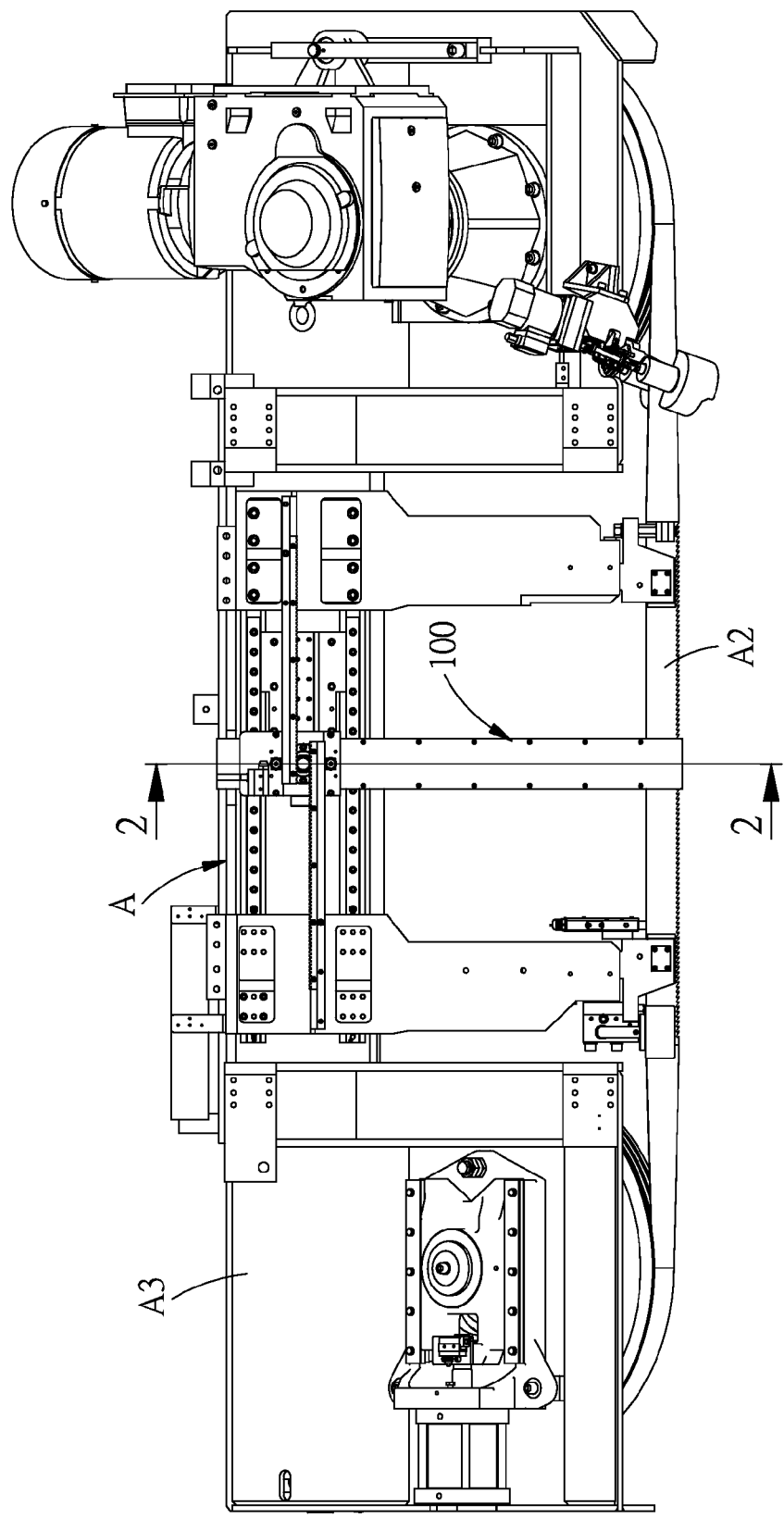
FIG. 1 shows that a lifting rod assembly with a coolant supply and pressurizing device in accordance with a preferred embodiment of the present invention is slidably disposed on a band saw machine.
Figure 2:
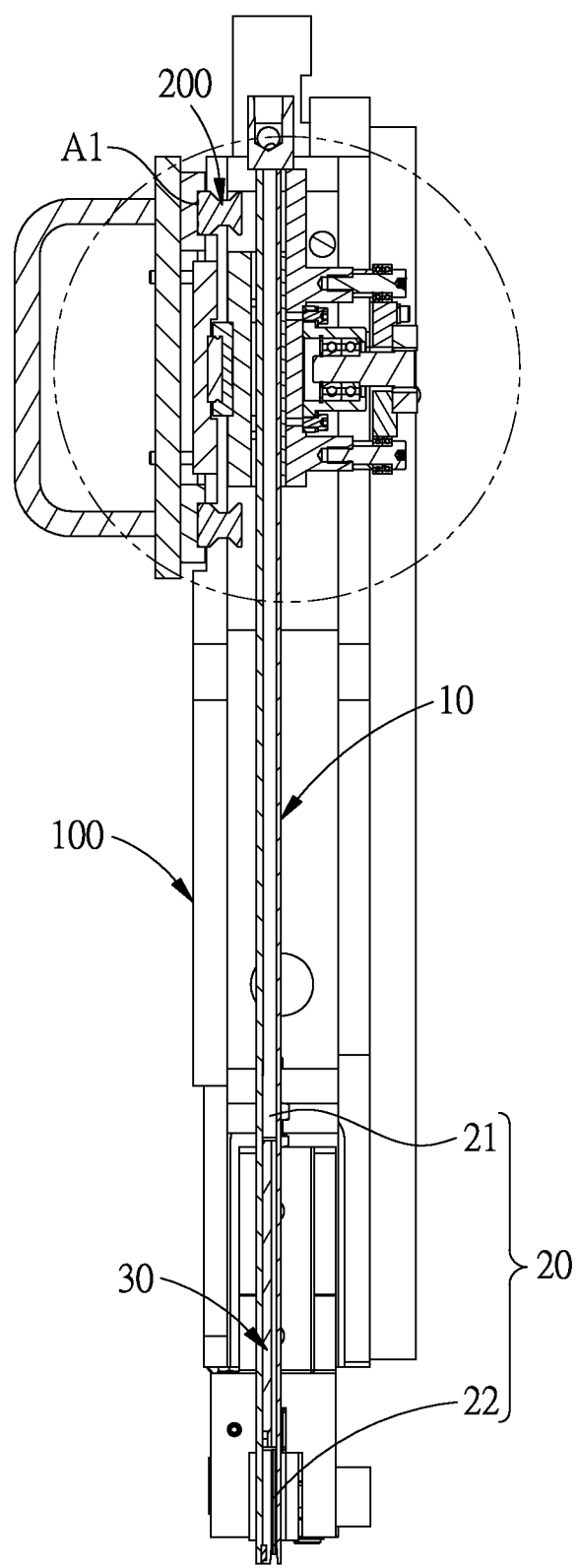
FIG. 2 is a cross sectional view of a part of the lifting rod assembly with a coolant supply and pressurizing device in accordance with the present invention.
Figure 3:
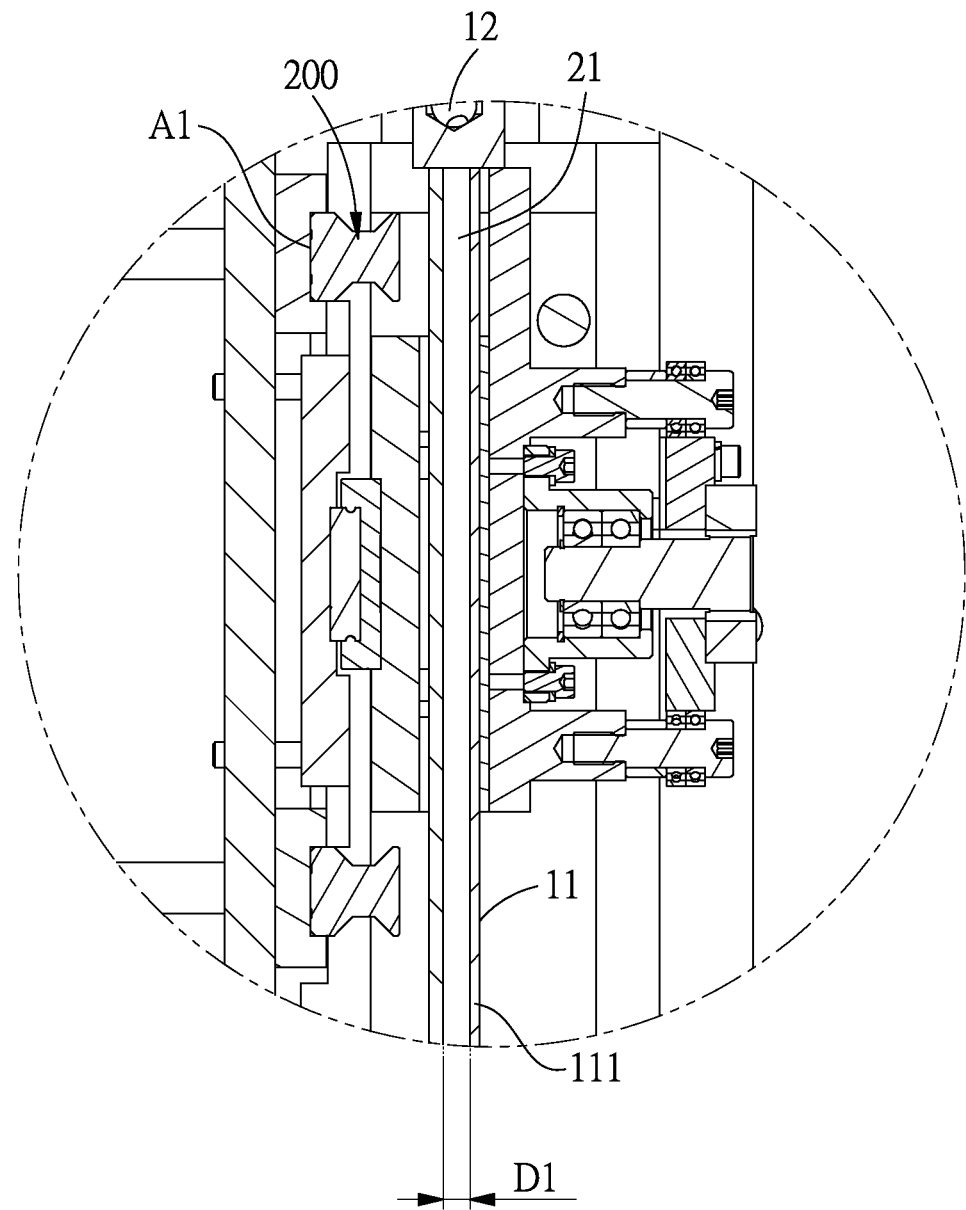
FIG. 3 is an enlarged view of a part of FIG. 2.
Figure 4A:
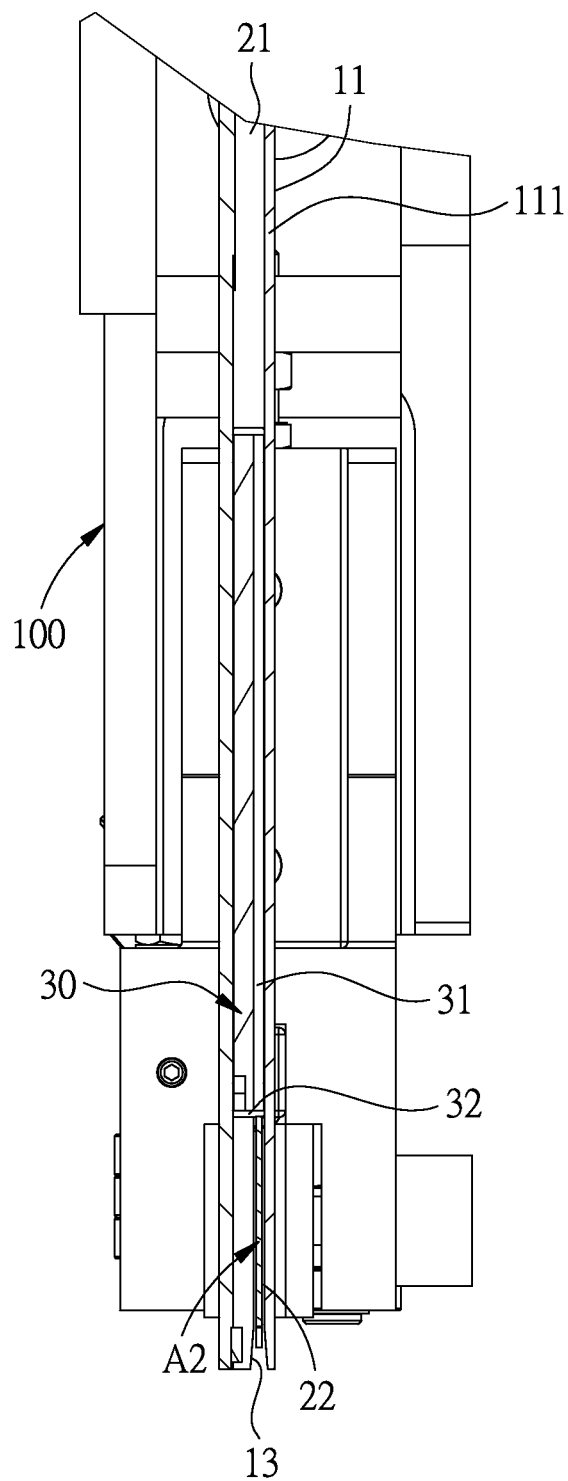
FIG. 4A is another magnified view of a part of FIG. 2.
Figure 4B:
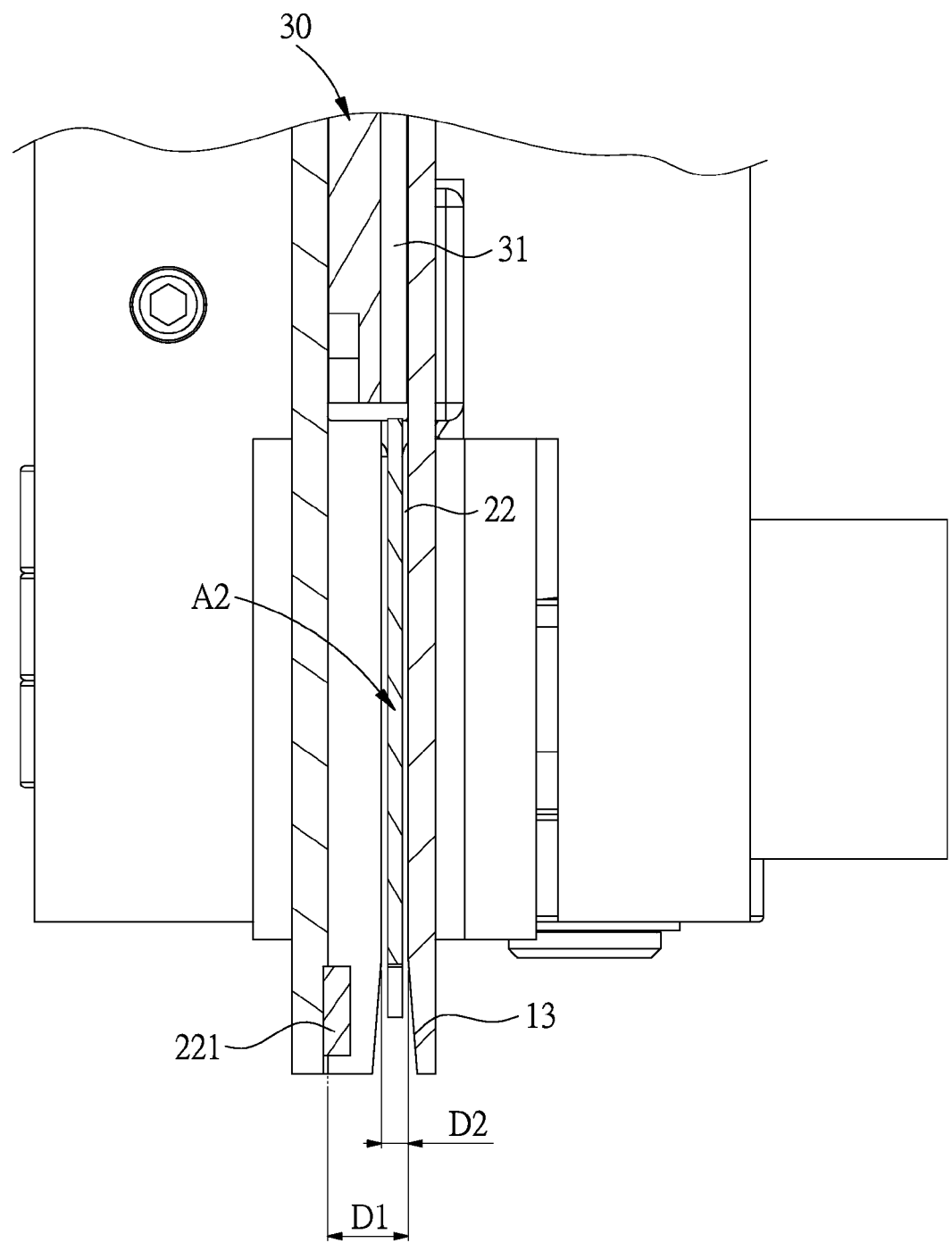
FIG. 4B is an enlarged view of a part of FIG. 4A.
Figure 4C:
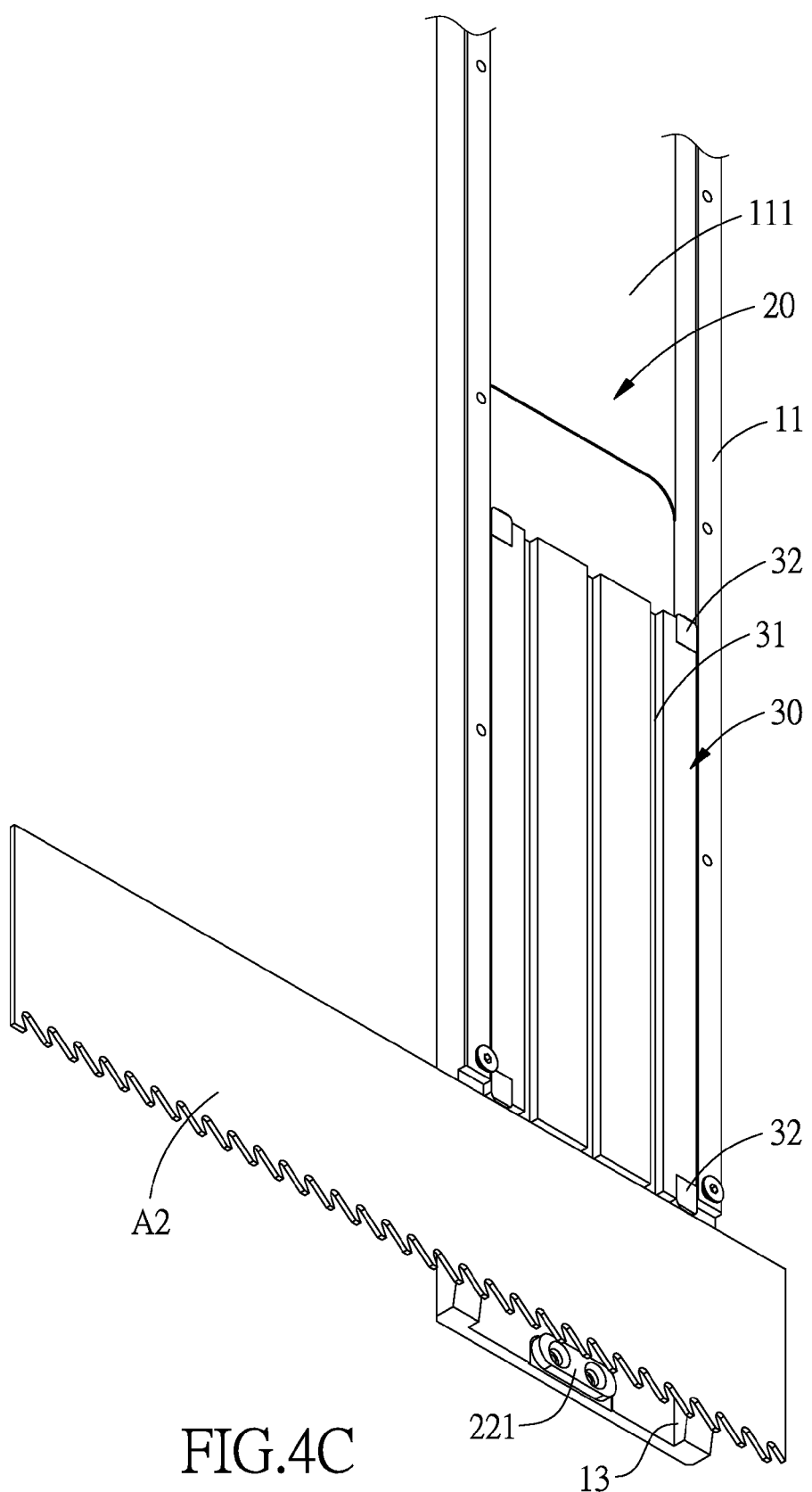
FIG. 4C shows a part of the lifting rod assembly with a coolant supply and pressurizing device in accordance with the present invention.
Figure 4D:
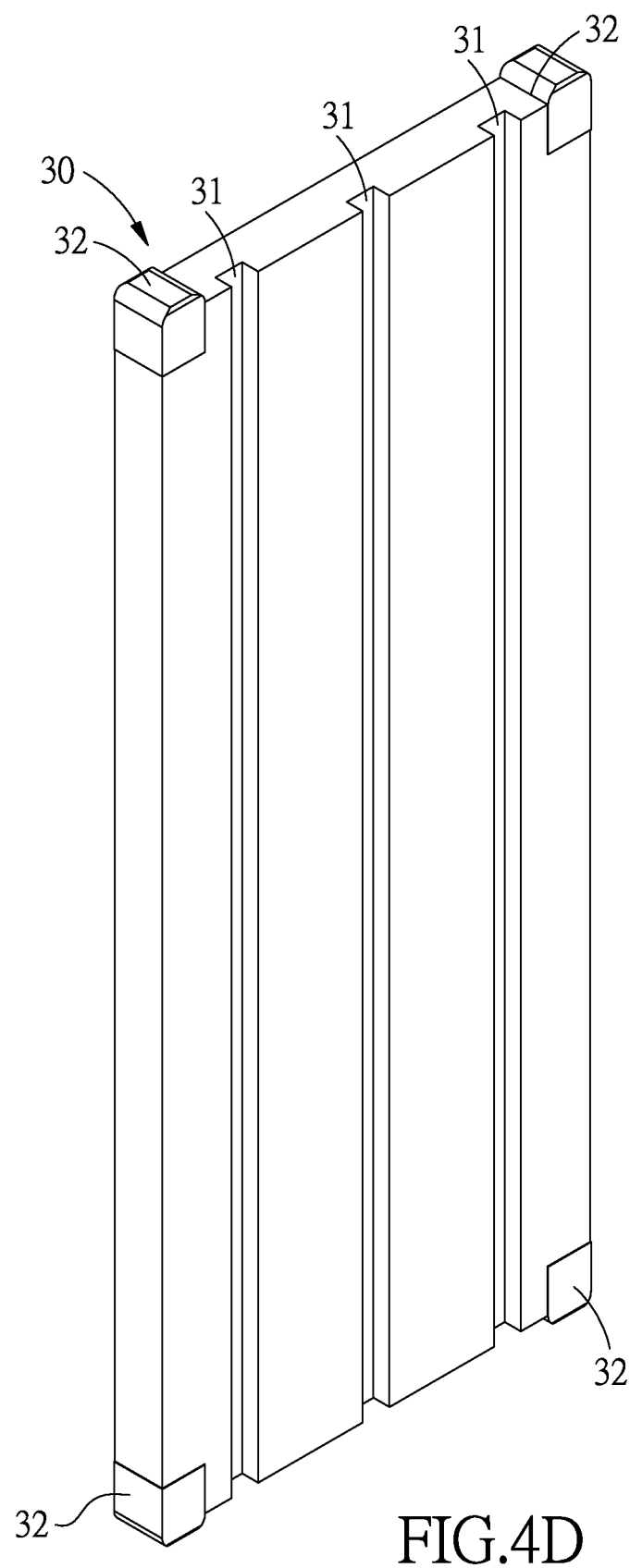
FIG. 4D shows the slider of the lifting rod assembly with the coolant supply and pressurizing device in accordance with the present invention.

Referring to FIGS. 1-4, a lifting rod assembly 100 with a coolant supply and pressurizing device 10 in accordance with a preferred embodiment of the present invention is slidably disposed on a band saw machine A which is provided with a plurality of slide grooves A1, a saw band A2, and a saw frame A3 which is able to move up and down.

The lifting rod assembly 100 is provided with the coolant supply and pressurizing device 10 and a plurality of slide blocks 200 slidably disposed in the slide grooves A1. The coolant supply and pressurizing device 10 includes a pipe 11 which runs through the lifting rod assembly 100, the pipe 11 has a peripheral wall 111 which defines an inner passage 20, and the inner passage 20 has an open input end 12 and an open flared output end 13, and further includes an input section 21 and an output section 22 which are sequentially arranged from the open input end 12 toward the open output end 13. The input section 21 includes a first diameter D1, and the output section 22 is in communication with the output end 13 and provided with a restricting block 221. In the inner passage 20 is movably disposed a slider 30 which is restricted in the inner passage 20 by the restricting block 221. The slider 30 is provided with a plurality of pressure flutes 31, each of the pressure flutes 31 has a cross section D2 smaller than the first diameter D1, and both ends of the slider 30 are provided with at least four buffers 32 which are located at each of the corners of the slider 30. The saw band A2 is inserted in the output end 13 of the lifting rod assembly 100, and the slider 30 is abutted against the saw band A2.

The lifting rod assembly 100 is mounted on the band saw machine A, and adjustable in position based on the size of the workpiece to be cut. During cutting process, coolant is fed into the pipe 11 of the coolant supply and pressurizing device 10 of the lifting rod assembly 100 via the open input end 12, then the coolant flows through the input section 21 and the pressure flutes 31 of the slider 30. Since flow rate=flow velocity*size of flow passage, when the flow rate is constant, the smaller the size of flow passage, the larger the flow velocity. Hence, the flow velocity will be increased when coolant sequentially flows through the large-diameter input section 21 and the small-diameter pressure flutes 31, namely, the coolant is pressurized.

It is to be noted that the slider 30 is freely and movably disposed in the inner passage 20, the lifting rod assembly 100 is capable of moving up and down along with the saw frame A3 of the band saw machine A to cover or move away from the saw band A2. Before the lifting rod assembly 100 moves down to over the saw band A2, the slider 30 falls by gravity to the restricting block 221 at the output section 22. When the lifting rod assembly 100 moves down to a position where the saw band A2 is within the output end 13, the saw band A2 will come into the pipe 11 via the output section 22. Meanwhile, the saw band A2 comes into contact with the buffers 32, so that the inertia of the saw band A2 is absorbed by the buffers 32, which prevents the saw band A2 from shifting or vibrating, and thus improving the movement precision of the saw band A2. Besides, the buffers 32 keep abutting against the saw band A2 even when the saw band A2 is cutting, so as to prevent the saw band A2 from shifting or vibrating during cutting process, thus improving the stability of the saw band A2 and cutting quality.

It is learned from the above description that coolant is outputted from the coolant supply and pressurizing device 10 disposed in the lifting rod assembly 100, when the size of the workpiece changes, moving the lifting rod assembly 100 can make the coolant supply and pressurizing device 10 move to the workpiece. Besides, the flow velocity can be increased when coolant sequentially flows through the large-diameter input section 21 and the small-diameter pressure flutes 31, namely, the coolant is pressurized, so as to improve swarf-removing efficiency and cooling efficiency. The present invention also stabilizes the saw band A2, and improves cutting accuracy and yield rate. Besides, even if the workpiece is relative small, and the coolant supply and pressurizing device 10 is difficult to target at the workpiece, the flared configuration of the flared output end 13 of the lifting rod assembly 100 allows the coolant to be sprayed out in a radial manner, so as to increase the effective area of the coolant.

The coolant supply and pressurizing device 10 can be easily disposed on the lifting rod assembly 100, so that the lifting rod assembly 100 is able to supply coolant, and moving the lifting rod assembly 100 can change the location of the coolant supply and pressurizing device 10, which improves convenience of use. Furthermore, the coolant can be pressurized without using extra pressurizing device, so as to reduce cost. In addition, the lifting rod assembly 100 is slidably disposed on the band saw machine A, making the band saw machine A suitable for more workpieces.

While we have shown and described various embodiments in accordance with the present invention, it is clear to those skilled in the art that further embodiments may be made without departing from the scope of the present invention.

What is claimed is:

1. A band saw machine comprising:
    a lifting rod assembly with a coolant supply and pressurizing device, a pipe running through the lifting rod assembly and including a peripheral wall which defines an inner passage, and the inner passage including an open input end, an open output end, and an input section and an output section which are sequentially arranged from the open input end toward the open output end, the output section being in communication with the output end, the input section including a first diameter; and
    in the inner passage being movably disposed a slider which is restricted in the inner passage, the slider being provided with said pressuring device comprising:
        a plurality of pressure flutes, each of the pressure flutes having a cross section smaller than the first diameter, and both ends of the slider being provided with at least four buffers which are located at each of the corners of the slider,
    a band saw of the band saw machine is inserted in the output end of the lifting rod assembly, and the slider is abutted against the band saw.

2. The band saw machine as claimed in claim 1, wherein the lifting rod assembly is slidably disposed on the band saw machine which is provided with a plurality of slide grooves, and the lifting rod assembly is provided with a plurality of slide blocks which are slidably disposed in the slide grooves.

3. The band saw machine as claimed in claim 1, wherein the open output end is flared.

* * * * *